United States Patent [19]

Sunaga

[11] Patent Number: 5,247,294
[45] Date of Patent: Sep. 21, 1993

[54] SIGNAL SELECT CONTROL CIRCUIT AND SIGNAL SELECT CIRCUIT USING THE SAME

[75] Inventor: Hideo Sunaga, Ashikaga, Japan
[73] Assignee: Fujitsu Limited, Kawasaki, Japan
[21] Appl. No.: 715,584
[22] Filed: Jun. 14, 1991

[30] Foreign Application Priority Data

Jun. 14, 1990 [JP] Japan .............................. 2-155685

[51] Int. Cl.$^5$ ............................................ H04B 1/00
[52] U.S. Cl. .......................... 340/825,510; 340/825.5
[58] Field of Search ................ 340/825.51, 825.5; 370/94.1; 307/239, 242, 364; 364/715.01, 715.03, 715.06, 715.1

[56] References Cited

U.S. PATENT DOCUMENTS

| | | | |
|---|---|---|---|
| 4,347,510 | 8/1982 | Ishigaki et al. | 340/825.5 |
| 4,420,695 | 12/1983 | Fisher | 340/825.5 |
| 4,954,978 | 9/1990 | Terane et al. | 340/825.5 |

FOREIGN PATENT DOCUMENTS 62-169516 7/1987 Japan .
63-231661 9/1988 Japan .

*Primary Examiner*—Donald J. Yusko
*Assistant Examiner*—Dervis Magistre
*Attorney, Agent, or Firm*—Staas & Halsey

[57] ABSTRACT

A signal select control circuit for a select circuit, which selects one of a plurality of predetermined signals, in accordance with a select signal comprising an arrangement change circuit, a priority-based select circuit, and an arrangement reverse circuit. The arrangement change circuit receives n input signals (n is an integer) arranged in parallel in accordance with a first arrangement and changes an arrangement of the n input signals in accordance with a control signal indicative of a priority order so that the n input signals are arranged in parallel in accordance with a second arrangement based on the priority order. The priority-based select circuit receives the n input signals having the second arrangement and generates n output signals arranged in parallel in accordance with a third fixed arrangement. The n output signals indicates one of the n input signals, which has a highest priority among valid input signals among the n input signals. The arrangement reverse circuit changes an arrangement of the n output signals so that the n output signals are arranged in parallel in accordance with an arrangement identical to the first arrangement of the n input signals. The n output signals arranged in parallel in accordance with the arrangement identical to the first arrangement serve as the select signal.

19 Claims, 6 Drawing Sheets

FIG. 2 PRIOR ART

INPUT SIGNAL

| | 1 | 2 | 3 | | | | | | |
|---|---|---|---|---|---|---|---|---|---|
| A1 | 1 | 0 | 0 | --- | 0 | 0 | --- | 0 | 0 |
| A2 | X | 1 | 0 | | 0 | 0 | | 0 | 0 |
| A3 | X | X | 1 | | 0 | 0 | | 0 | 0 |
| ⋮ | X | X | X | | 0 | 0 | | 0 | 0 |
| Ai | X | X | X | --- | 1 | 0 | --- | 0 | 0 |
| Ai-1 | X | X | X | | X | 1 | | 0 | 0 |
| ⋮ | X | X | X | | X | X | | 0 | 0 |
| An-1 | X | X | X | | X | X | | 1 | 0 |
| An | X | X | X | --- | X | X | --- | X | 1 |

OUTPUT SIGNAL

| | 1 | 2 | 3 | | | | | | |
|---|---|---|---|---|---|---|---|---|---|
| B1 | 1 | 0 | 0 | --- | 0 | 0 | --- | 0 | 0 |
| B2 | 0 | 1 | 0 | | 0 | 0 | | 0 | 0 |
| B3 | 0 | 0 | 1 | | 0 | 0 | | 0 | 0 |
| ⋮ | 0 | 0 | 0 | | 0 | 0 | | 0 | 0 |
| Bi | 0 | 0 | 0 | --- | 1 | 0 | --- | 0 | 0 |
| Bi-1 | 0 | 0 | 0 | | 0 | 1 | | 0 | 0 |
| ⋮ | 0 | 0 | 0 | | 0 | 0 | | 0 | 0 |
| Bn-1 | 0 | 0 | 0 | | 0 | 0 | | 1 | 0 |
| Bn | 0 | 0 | 0 | --- | 0 | 0 | --- | 0 | 1 |

SIGNAL SELECT CONTROL CIRCUIT AND SIGNAL SELECT CIRCUIT USING THE SAME

BACKGROUND OF THE INVENTION

The present invention generally relates to signal select circuits, and more particularly to a signal select circuit, which receives n input signals (n is an integer), and selects one of the n input signals in order of priority. Further, the present invention is concerned with a signal select control circuit, which controls a signal select circuit as described above.

Signal select circuits are widely used in signal processing devices. For example, a signal select circuit receives n input signals and selects one of the n input signals in order of a predetermined signal number respectively assigned to each of the n input signals. Examples of such signal processing devices are an exchange, which forms a synchronous communication network in a wire communication system, and a transmission device in the synchronous communication network. Conventionally, such signal processing devices use a single master clock generated by a clock signal source provided in common for the entire synchronous communication network. Recently, a communication network, which has a redundant structure including a plurality of clock signal sources, has been proposed in order to ensure the operation of the system if one of the clock signal sources has a failure. In this case, a priority order is determined beforehand in which one of the clock signal sources is selected when a failure occurs, so that one clock signal source, which has the highest priority, can be selected from among the clock signal sources, which are normally working. It should be noted that the setting of the priority order is based on various conditions, such as the system structure and the situation in which the system is provided. Thus, it is necessary to determine a plurality of priority orders in order to cope with the various conditions. For this purpose, conventionally, a plurality of signal select circuits are provided.

FIG. 1 is a block diagram of a system using a conventional signal select circuit. The system shown in FIG. 1 includes a priority-based select circuit 1 and a signal selector 2. Signals A1 - An show the states of respective n devices, such as clock signal sources. Each of the signals A1 - An has a logical value of "1" (valid) when the corresponding device is normally working, and has a logical value of "0" (invalid) when it has a failure. The signals A1 - An are input to the priority-based select circuit 1, which generates output signals B1 - Bn in response to the input signals A1 - An. The output signals B1 - Bn show, which one of the input signals A1 - An (n devices) should be selected in a predetermined priority order and show that the other input signals should not be selected. The output signals B1 - Bn are transmitted to and input by the signal selector 2, which receives signals S1 - Sn, which are subjected to a select operation executed by the signal selector 2. The signal selector 2 selects one of the signals S1 - Sn specified by the output signals B1 - Bn.

During operation, each of the input signals A1 - An is equal to "0" or "1". Assuming that "1" is a valid signal, the priority-based select circuit 1 sets one of the output signals B1 - Bn in response to valid signals out of the input signals A1 - An to be "1" in a predetermined priority order, and sets the other output signals to be "0".

FIG. 2 is a diagram showing the logical function, which forms the priority-based select operation executed by the priority-based select circuit 1. An upper block shown in FIG. 2 indicates the states of the input signals A1 - An, and a lower block shown therein indicates the states of the output signals B1 - Bn. The logical function shown in FIG. 2 is defined so that the priority becomes higher as the suffix of the input signals A1 - An becomes smaller (A1 > A2 > ... > An). In the columns of the upper block shown in FIG. 2, "1" shows a normal state, "0" shows an abnormal state, and "X" shows either "1" or "0" ("don't care"). In the columns of the lower block shown in FIG. 2, "1" means that the corresponding output signal should be selected and "0" means that it should not be selected.

The input signals A1 - An having the respective states defined at the first column correspond to the output signal B1 - Bn having the respective states defined at the first column. That is, the input signals A1 - An having the respective states defined at the ith column correspond to the output signal B1 - Bn having the respective states defined at the ith column. For example, when the input signal A1 indicates "0" (the corresponding clock signal source S1 has a failure) and the input signal A2 indicates "1", the output signals B1 - Bn defined at the second column are output by the priority-based select circuit 1. As shown in FIG. 2, only the output signal B2 indicates "1" and the other output signals B1 and B3 - Bn indicate "0". When the output signal B2 indicates "1", the select circuit 2 selects the corresponding clock signal source S2.

As described above, the logical function of the priority-based select circuit 1 is based on the priority order of A1 > A2 > ... > An, and is configured so that this priority order is realized. It should be noted that the priority order defined in the priority-based select circuit 1 is fixed. As has been described previously, it is required that the system having a signal priority circuit as described above can operate in different priority orders based on the various conditions. Thus, the conventional system shown in FIG. 1 cannot cope with the requirement of use of different priority orders.

In order to meet the above-mentioned requirement, a system shown in FIG. 3 has been proposed. As shown in FIG. 3, the system includes a plurality of priority-based select circuits 3-1, 3-2, ..., 3-m where m is an integer. Input signals A1-A5 (n=5) are respectively input to the priority-based select circuits 3-1 through 3-m. The input signals A1-A5 are arranged on the input side of each of the priority-based select circuits 3-1 through 3-m so that they are arranged in a priority order inherent in each of the priority-based select circuits 3-1 through 3-m. For example, the input signals A1-A5 on the input side of the priority-based select circuit 3-1 are arranged in a priority order of A1 > A2 > ... > A5, and the input signals A1-A5 on the input side of the priority-based select circuit 3-2 are arranged in a priority order of A2 > A1 > A3 > A4 > A5. Output signals of the priority-based select circuits 3-1 through 3-m are respectively input to a selector 4, which selects one of the output signals of the priority-based select circuits 3-1 through 3-m in accordance with a control signal Cf supplied from an external device. With the above-mentioned arrangement, it becomes possible to selectively use the m priority orders.

However, it is necessary to provide a plurality of priority-based select circuits, as described above. More specifically, when n input signal lines are used, there are a maximum of n! of priority orders, and thus n! priority-based select circuits may need to be provided. For example, when n=5, 120 (=5!) priority order circuits may need to be provided.

SUMMARY OF THE INVENTION

It is a general object of the present invention to provide an improved signal select control circuit in which the above-mentioned disadvantages are eliminated.

A more specific object of the present invention is to provide a compact signal select control circuit capable of specifying an arbitrary priority order.

The above objects of the present invention are achieved by a signal select control circuit provided for a select circuit, which selects one of a plurality of predetermined signals in accordance with a select signal, the signal select control circuit comprising:

an arrangement change unit for receiving n input signals (n is an integer) arranged in parallel in accordance with a first arrangement and for changing an arrangement of the n input signals in accordance with a control signal indicative of a priority order so that the n input signals are arranged in parallel in accordance with a second arrangement based on the priority order;

a priority-based select unit, operatively coupled to the arrangement change unit, for receiving the n input signals having the second arrangement and for generating n output signals arranged in parallel in accordance with a third fixed arrangement, the n output signals, indicating one of the n input signals which has a highest priority among valid input signals among the n input signals; and an arrangement reverse unit, operatively coupled to the priority-based select unit, for changing an arrangement of the n output signals so that the n output signals are arranged in parallel in accordance with an arrangement identical to the first arrangement of the n input signals, the n output signals arranged in parallel in accordance with the arrangement identical to the first arrangement serving as the select signal.

Another object of the present invention is to provide a signal select circuit having the above-mentioned signal select control circuit.

This object of the present invention is achieved by a signal select circuit comprising: n signal circuits (n is an integer) outputting n predetermined signals; a select unit, operatively coupled to the n signal circuits, for selecting one of the n predetermined signals in accordance with a select signal; a control signal generating unit for generating a control signal indicating a priority order; and a signal select control circuit coupled to the selector and generating the select signal. The above signal select control circuit comprises:

an arrangement change unit for receiving n input signals (n is an integer) arranged in parallel in accordance with a first arrangement and for changing an arrangement of the n input signals in accordance with the priority order indicated by the control signal so that the n input signals are arranged in parallel in accordance with a second arrangement based on the priority order;

a priority-based select unit, operatively coupled to the arrangement change unit, for receiving the n input signals having the second arrangement and for generating n output signals arranged in parallel in accordance with a third fixed arrangement, the n output signals indicating one of the n input signals, which has a highest priority among valid input signals among the n input signals; and an arrangement reverse unit, operatively coupled to the priority-based select unit, for changing an arrangement of the n output signals so that the n output signals are arranged in parallel in accordance with an arrangement identical to the first arrangement of the n input signals, the n output signals arranged in parallel in accordance with the arrangement identical to the first arrangement serving as the select signal.

BRIEF DESCRIPTION OF THE DRAWINGS

Other objects, features and advantages of the present invention will become more apparent from the following detailed description when read in conjunction with the accompanying drawings, in which:

FIG. 2 is a diagram showing the operation of a priority-based select circuit shown in FIG. 1;

DESCRIPTION OF THE PREFERRED EMBODIMENTS

Figure 1:
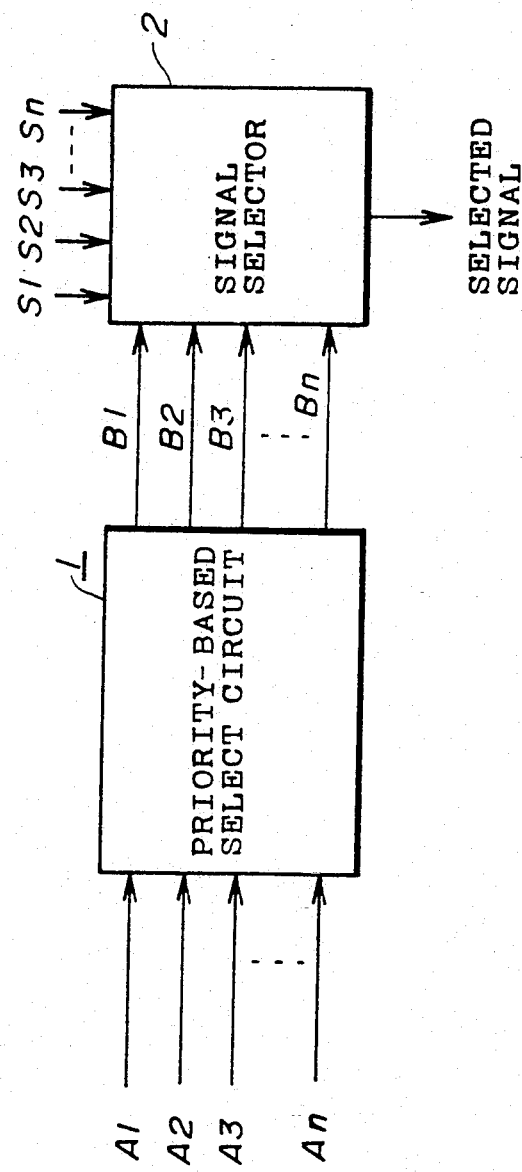
FIG. 1 is a block diagram of a conventional signal select circuit.
Figure 3:
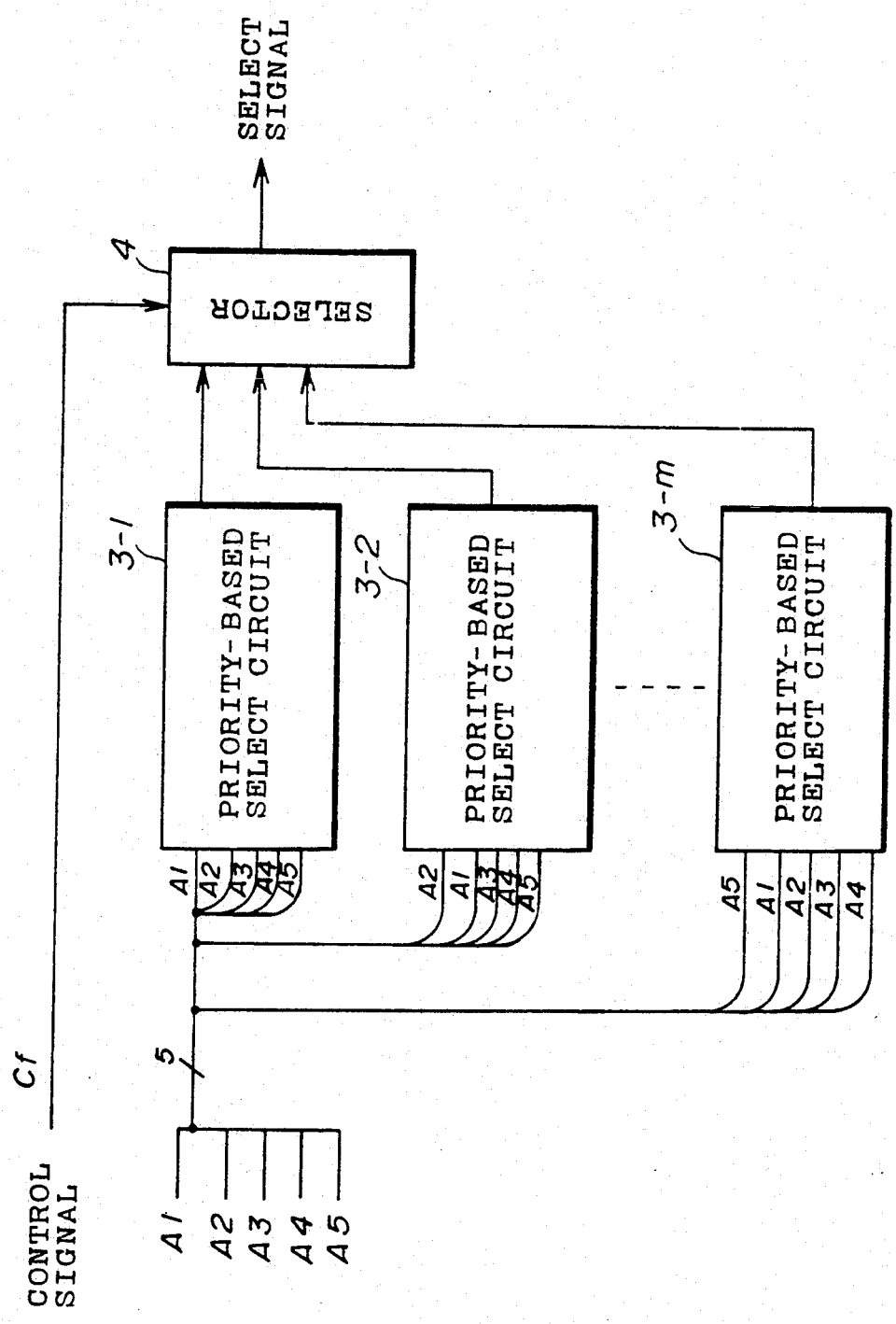
FIG. 3 is a block diagram of a priority-based select circuit different from that shown in FIG. 1.
Figure 4:
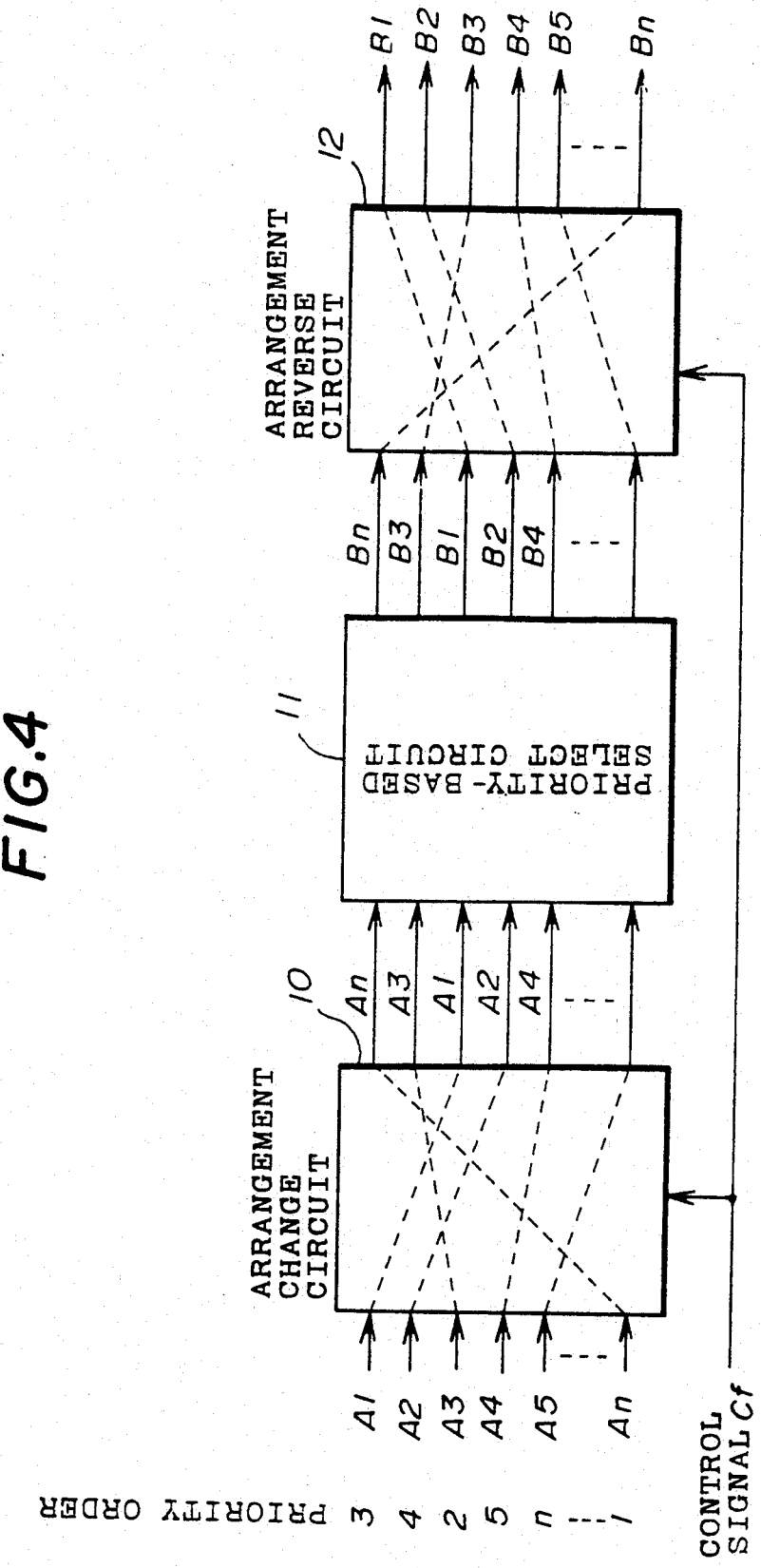
FIG. 4 is a block diagram showing the principle of a signal select control circuit of the present invention.

FIG. 4 shows the principle of the present invention. A signal select control circuit shown in FIG. 4 includes an arrangement change circuit 10, a priority-based select circuit 11 and an arrangement reverse (adverse change) circuit 12. Input signals A1 - An are input to the arrangement change circuit 10 so that they have a fixed arrangement. In other words, the arrangement change circuit 10 has n input terminals consisting of the first through nth input terminals, which always receive the input signals A1 - An, respectively. A control signal Cf, which indicates a desired priority order regarding the input signals A1 - An, is supplied to the arrangement change circuit 10 from an external device. The arrangement change circuit 10 changes the arrangement of the input signals A1 - An in the priority order indicated by the control signal Cf. For example, as shown in FIG. 4, when the priority order indicated by the control signal Cf is such that An > A3 > A1 > A2 > A4 ..., the arrangement change circuit 10 rearranges the input signals A1 - An in the indicated priority order. In the configuration shown in FIG. 4, the uppermost one of the n output signal lines extending from the arrangement change circuit 10 has the highest priority, and the lowermost signal line thereof has the lowest priority.

The priority-based select circuit 11 has a logical function, which is the same as shown in FIG. 2, and selects one of valid signals which has the highest priority. If the input signal An, which has the highest priority indicates "1" (valid), the priority-based select circuit 11 sets only the corresponding output signal Bn to be "1", and sets each of the other output signals B1 - Bn-1 to be "0". If the input signal An indicates "0" (invalid) and the input signal A3 having the second highest priority indicates "1", the priority-based select circuit 11 sets only the corresponding output signal B3 to be "1", and sets the other output signals B1, B2 and B4 - Bn to be "0".

The arrangement reverse circuit 12 receives the output signals Bn, B3, B1, B2, B4, ... from the priority-based select circuit 11, and reverses the arrangement thereof so that the arrangement of the output signals corresponds to that of the input signals A1 - An. Thus, the arrangement reversing circuit 12 rearranges the output signals in order of B1, B2, B3, ..., Bn. This reversing procedure can be changed in accordance with the control signal Cf.

It is possible to determine a desired priority order by changing the arrangement between the input and output of each of the arrangement change circuit 10 and the arrangement reverse circuit 12. It should be noted that the signal select control circuit shown in FIG. 4 has only one priority-based select circuit 11 having the fixed logical function based on the relationship shown in FIG. 2. As a result, as the number of input signals increases, the size of the signal select control circuit increases substantially linearly.

Figure 5:
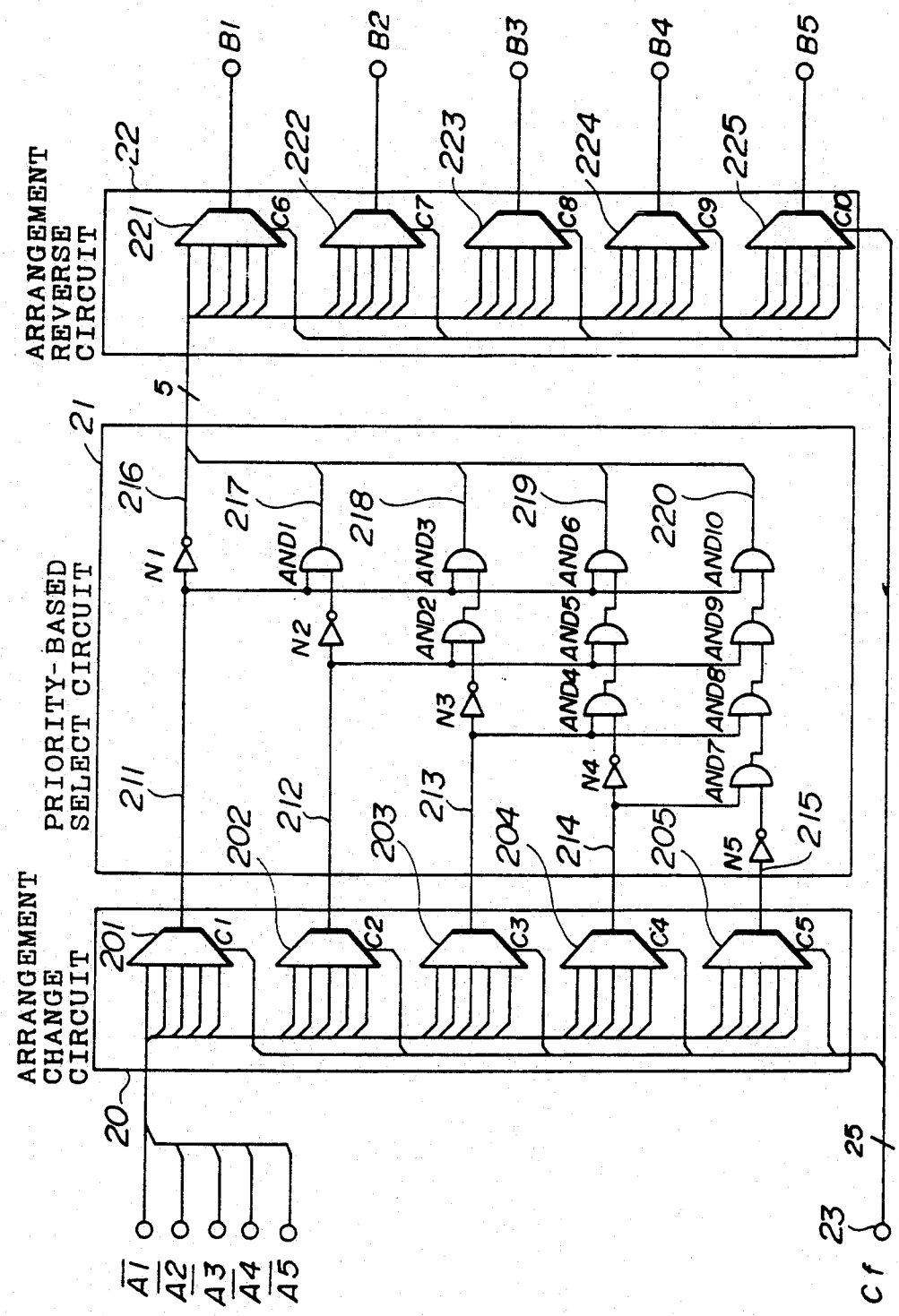
FIG. 5 is a circuit diagram showing the structure of the signal select control circuit shown in FIG. 4 in more detail and FIG. 6 is a block diagram of a device having a signal select circuit controlled by the signal select control circuit according to the present invention.

FIG. 5 is a circuit diagram showing the structure shown in FIG. 4 in more detail. The circuit includes an arrangement change circuit 20, a priority-based select circuit 21 and an arrangement reverse circuit 22, which correspond to the arrangement change circuit 10, the priority-based select circuit 11 and the arrangement reverse circuit 12. The arrangement change circuit 20 receives inverted versions $\overline{A1}$ through $\overline{A5}$ of the input signals A1 through A5 (n=5). The arrangement change circuit 20 has five selectors 201, 202, 203, 204 and 205, each receiving the control signal Cf via a control terminal 23. More specifically, the control signal Cf includes control signals C1, C2, C3, C4 and C5 respectively supplied to the selectors 201, 202, 203, 204 and 205.

Similarly, the arrangement reverse circuit 22 includes five selectors 221, 222, 223, 224 and 225, which respectively receive control signals C6, C7, C8, C9 and C10 contained in the control signal Cf applied to the control terminal 23.

The priority-based select circuit 21 realizes the relationship between the input and output signals shown in FIG. 2. More specifically, the priority-based select circuit 21 includes NOT gates N1 through N5, and AND gates AND1 through AND10.

Each of the selectors 201 through 205 is supplied with the inverted versions $\overline{A1}$ through $\overline{A5}$ of the input signals A1 through A5. When the input signal A1 indicates "1", the inverted version thereof indicates "0". Such an operation holds true for the other input signals A2-A5. It is now assumed that the circuit shown in FIG. 5 operates in a priority order of A5>A3>A1>A2>A4. The control signal Cf indicates the priority order of A5>A3>A1>A2>A4. Each of the control signals C1 through C5 included in the control signal Cf consists of five bits. Thus, 25 bits of the control signal Cf are applied to the arrangement change circuit 20.

The selectors 201, 202, 203, 204 and 205 select the inverted versions $\overline{A5}$, $\overline{A3}$, $\overline{A1}$, $\overline{A2}$ and $\overline{A4}$, respectively in accordance with the contents of the control signal Cf. The selected inverted versions $\overline{A5}$, $\overline{A3}$, $\overline{A1}$, $\overline{A2}$ and $\overline{A4}$ are respectively output to signal lines 211, 212, 213, 214 and 215 of the priority-based select circuit 21. The inverted version $\overline{A5}$ on the signal line 211 is inverted by the NOT gate N1. When the inverted version $\overline{A5}$ indicates "0" (input signal A5 indicates "1"), the NOT gate N1 outputs "1" to a signal line 216 extending from the NOT gate N1. This means that the input signal A5 has the highest priority among the valid input signals. It can be seen from the configuration of the priority-based select circuit 21 that "0" is respectively output to the other signal lines 217, 218, 219 and 220. On the other hand, if the inverted version $\overline{A5}$ indicates "1" (input signal A5 indicates "0"), the NOT gate N1 outputs "0" to the signal line 216. This means that the input signal A5 does not have the highest priority, which is to be selected. At this time, the inverted version $\overline{A3}$ on the signal line 212 indicates "0" (A3="1"), the NOT gate N2 outputs "1", which is input to the AND gate AND1. Since the AND gate AND1 receives "1" from the signal line 211, it outputs "1" to the signal line 217. This means that the input signal A3 has the highest priority. The priority-based select circuit 21 includes the signals lines 218, 219 and 220 extending from the AND gates AND3, AND6 and AND10, respectively, and operates in a way similar to the above mentioned way.

The signal lines 216 through 220 extending from the priority-based select circuit 21 are transmitted, in parallel form, to each of the selectors 221 through 225 of the arrangement reverse circuit 22. The arrangement reverse circuit 22 receives and changes the arrangement of B5, B3, B1, B2, B4 to the arrangement which is the same as that of the input signals A1, A2, A3, A4 and A5. That is, the output of the arrangement reverse circuit 22 has an arrangement of B1, B2, B3, B4 and B5. The control signal C6 instructs the selector 221 to select the output signal B1. Similarly, the control signals C7, C8, C9 and C10 instruct the selectors 222, 223, 224 and 225 to select the output signals B2, B3, B4 and B5, respectively. In this way, the arrangement of the output signals B1 through B5 corresponding to that of the input signals A1 through A5 (inverted versions $\overline{A1}$ through $\overline{A5}$ thereof) can be obtained.

It is possible to determine a desired priority order by changing the arrangement between the input and output of each of the arrangement change circuit 20 and the arrangement reverse circuit 22. It should be noted that the signal select control circuit shown in FIG. 5 has only one priority-based select circuit 21 having the fixed logical function based on the relationship shown in FIG. 2. As a result, as the number of input signals increases, the size of the signal select control circuit increases substantially linearly.

Figure 6:
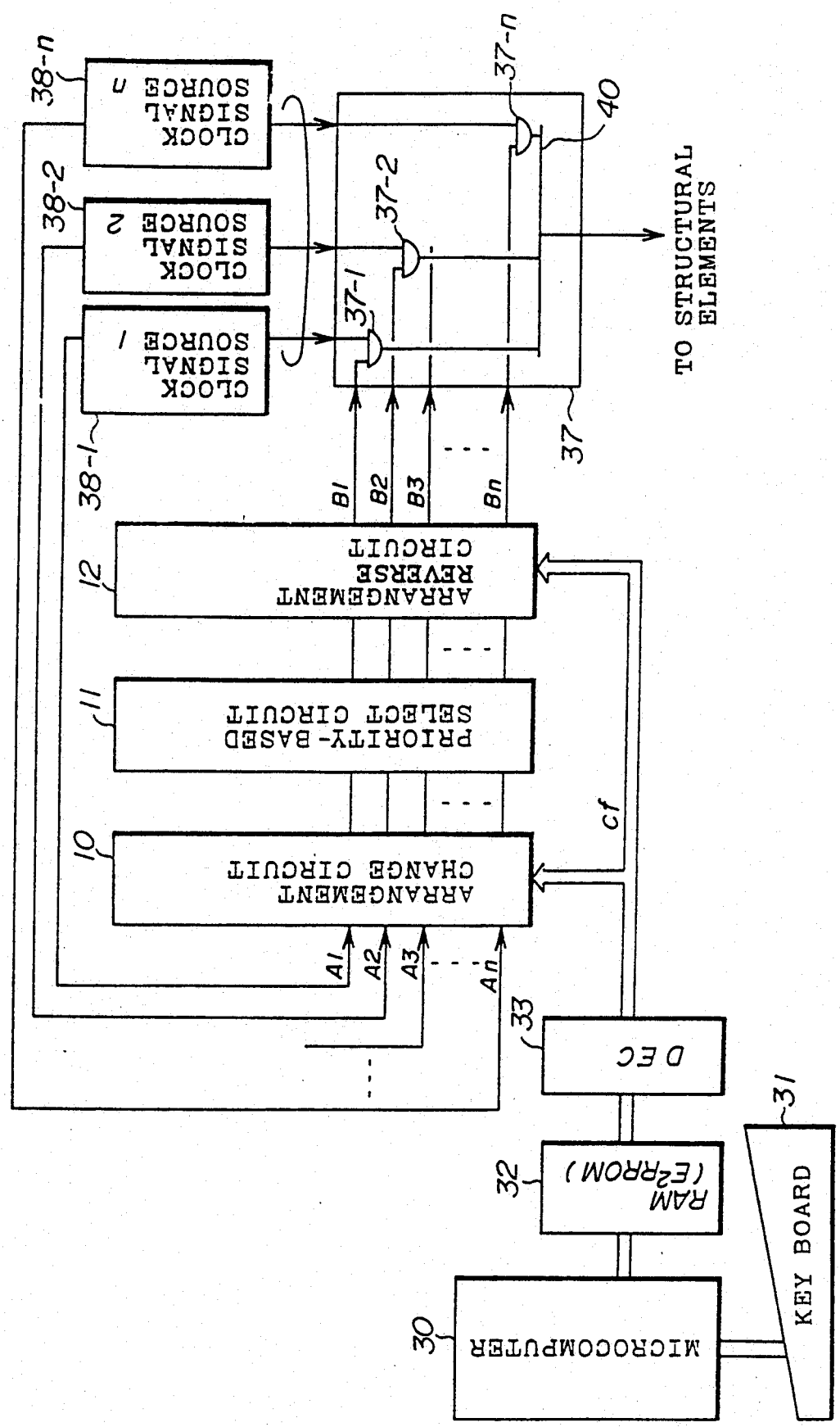

FIG. 6 is a block diagram of a device having a signal select circuit using the above-mentioned signal select control circuit. The signal select circuit is made up of the arrangement change circuit 10, the priority-based select circuit 11, the arrangement reverse circuit 12, and a select circuit 37. The device shown in FIG. 6 is a part of a digital communication system, and selects one normal clock signal source from among a plurality of clock signal sources.

The device shown in FIG. 6 includes a microcomputer 30, a keyboard 31, a RAM 32 formed of an E$^2$-PROM, a decoder (DEC) 33, clock signal sources 38-1, 38-2, ..., 38-n. The clock signal sources 38-1 through 38-n are, for example, a master clock device which receives a master clock transmitted from a communication device (a master device in the network) and which reproduces the same, an auxiliary device of such a master clock device, and two identical clock devices which generate identical clocks in order to cope with a failure. That is, the device shown in FIG. 6 has various types of clock signal sources. The priority order in which one of the various clock signal sources having the highest priority is selected changes in accordance with, for example, the environment where the device is installed and the condition where the device is operating.

Before starting operation of the communication device, the control signal Cf is supplied to the arrangement change circuit 10 and the arrangement reverse circuit 12. During the operation of the communication device, the control signal Cf is continuously supplied to the circuits 10 and 12.

The RAM 32 stores data (codes) related to all combinations of priority orders. An operator selects one of the combinations by using the keyboard 31. The microcomputer 30 receives the instruction by the operator, and reads out the corresponding data (code) from the RAM 32. The readout code is input to the decoder 33, which generates the control signal Cf from the readout code. The input signals A1 - An show the states of the clock signal sources 38-1 through 38-n, respectively, and are input to the arrangement change circuit 10. Then, the arrangement change circuit 10 changes the arrangement of the input signals A1 - An in the priority order indicated by the control signal Cf output by the decoder 33 in the way as has been described previously. Each of the input signals A1 - An indicates "1" when the corresponding clock signal source is normally working, and indicates "0" when it has a failure (that is, it is in an alarm state). The priority-based select circuit 11 selects one input signal, which has the highest priority, and sets only the corresponding one of the output signals B0 - Bn to be "1". The arrangement reverse circuit 12 changes the arrangement of the output signals from the priority-based select circuit 11 so that it is the same as that of the input signals A1 - An. The output signals B1 - Bn output by the arrangement reverse circuit 12 are input to AND gates 37-1 through 37-n, respectively. Since only one of the output signals B1 Bn is "1", the clock signal generated by the corresponding clock signal generator is allowed to pass through the corresponding AND gate. The outputs of the AND gates 37-1 through 37-n pass through a multiplexer (OR gate) 40, and are supplied to structural elements of the communication device necessary for the clock signal.

The present invention is not limited to the structure in which one of the clock signals is selected, but includes various signal processing circuits or devices in which signals are selected in a priority order, such as a computer system. Each of the control signals C1 through C10 shown in 5 consists of five bits. However, it is possible to form each of the control signals C1 through C10 of three bits by using a 3-to-5 decoder.

The present invention is not limited to the specifically disclosed embodiments, and variations and modifications may be made without departing from the scope of the present invention.

What is claimed is:

1. A signal select control circuit for a select circuit, which selects one of a plurality of predetermined signals in accordance with a select signal, said signal select control circuit comprising:

control signal generating means for generating a control signal indicative of a priority order;

arrangement change means, operatively coupled to said control signal generating means, for receiving n input signals, where n is an integer, arranged in parallel in accordance with a first arrangement and for changing the first arrangement of said n input signals in accordance with said control signal received from said control signal generating means so that said n input signals are arranged in parallel in accordance with a second arrangement based on said priority order;

priority-based select means, operatively coupled to said arrangement change means, for receiving said n input signals having said second arrangement and for generating n output signals arranged in parallel in accordance with a third arrangement which is fixed, said n output signals indicating which one of said n input signals has a highest priority among valid input signals among said n input signals, wherein each of said input signals has a corresponding value and is valid or invalid depending on the corresponding value thereof; and arrangement reverse means, operatively coupled to said control signal generating means and to said priority-based select means, for receiving and changing, in accordance with said control signal received from said control signal generating means, the third arrangement of said n output signals and outputting said received, n output signals, arranged in parallel in accordance with a fourth arrangement identical to said first arrangement of said n input signals, said n output signals arranged in parallel in accordance with said fourth arrangement serving as said select signal.

2. A signal select control circuit as claimed in claim 1, wherein:

said arrangement change means comprises n selectors, each of which receives said n input signals and said control signal; and an ith selector (i=1, 2, ..., n) among said n selectors selects one of said n input signals which has an ith priority in accordance with said control signal.

3. A signal select control circuit as claimed in claim 1, wherein:

said priority-based select means comprises n signal lines respectively receiving said n input signals having said second arrangement;

a first signal line among said n signal lines comprises first logical gate means for receiving a corresponding one of said n input signals from said arrangement change means and for generating a corresponding one of said n output signals; and an ith signal line (i=2, ..., n) among said n signal lines comprises second logical gate means for generating an ith output signal among said n output signals on the basis of the first through ith input signals among said n input signals from said arrangement change means.

4. A signal select control circuit as claimed in claim 1, wherein:

said arrangement reverse means comprises n selectors, each of which receives said n output signals from said priority-based select means and said control signal; and an ith selector (i=1, 2, ..., n) among said n selectors selects one of said n output signals, which has an ith position of said first arrangement of said n input signals in accordance with said control signal.

5. A signal select control circuit as claimed in claim 1, wherein each of said n input signals has a first level corresponding to a valid input signal, and a second level corresponding to an invalid input signal.

6. A signal select control circuit as claimed in claim 1, wherein said one of said n input signals, as received by said priority-based select circuit and which has said highest priority among said valid input signals, is handled thereby as a first level and each of the other (n - 1) input signals is handled thereby as a second level.

7. A signal select control circuit as claimed in claim 1, wherein each of said n input signals has said corresponding value indicating whether a corresponding source generating a corresponding predetermined signal is valid and therefore functioning in a normal state.

8. A signal select control circuit as claimed in claim 1, wherein said one of said n output signals generated by said priority-based select means and which has said highest priority among said valid n input signals, has a first level and each of the other output signals has a second level.

9. A signal select circuit comprising:
n signal circuits (n is an integer) outputting n predetermined signals;
select means, operatively coupled to said signal circuits, for selecting one of said n predetermined signals in accordance with a select signal; and
a signal select control circuit, coupled to said select means and generating said select signal, comprising:
control signal generating means for generating said control signal indicative of a priority order;
arrangement change means, operatively coupled to said control signal generating means, for receiving n input signals, where n is an integer, arranged in parallel in accordance with a first arrangement and for changing the first arrangement of said n input signals in accordance with said priority order indicated by said control signal received from said control signal generating means, so that said n input signals are arranged in parallel in accordance with a second arrangement based on said priority order;
priority-based select means, operatively coupled to said arrangement change means, for receiving said n input signals having said second arrangement and for generating n output signals arranged in parallel in accordance with a third arrangement which is fixed, said n output signals indicating which one of said n input signals has a highest priority among valid input signals among said n input signals, wherein each of said input signals has a corresponding value and is valid or invalid depending on the corresponding value thereof; and
arrangement reverse means, operatively coupled to said control signal generating means and to said priority-based select means, for receiving and changing, in accordance with said control signal received from said control signal generating means, the third arrangement of said n output signals and outputting said received, n output signals, arranged in parallel in accordance with a fourth arrangement identical to said first arrangement of said n input signals, said n output signals arranged in parallel in accordance with said fourth arrangement serving as said select signal.

10. A signal select circuit as claimed in claim 9, wherein said n input signals show respective states of operation of said n signal circuits.

11. A signal select circuit as claimed in claim 9, wherein said n signal circuits are comprised of n clock signal generators, which generate respective clock signals corresponding to said n predetermined signals.

12. A signal select circuit as claimed in claim 9, wherein:

said arrangement change means comprises n selectors, each of which receives said n input signals and said control signal; and
an ith selector (i=1, 2, ..., n) among said n selectors selects one of said n input signals, which has an ith priority in accordance with said control signal.

13. A signal select circuit as claimed in claim 9, wherein:
said priority-based select means comprises n signal lines respectively receiving said n input signals having said second arrangement;
a first signal line among said n signal lines comprises first logical gate means for receiving a corresponding one of said n input signals from said arrangement change means and for generating a corresponding one of said n output signals; and
an ith signal line (i=2, ..., n) among said n signal lines comprises second logical gate means for generating an ith output signal among said n output signals on the basis of the first through ith input signals among said n input signals from said arrangement change means.

14. A signal select circuit as claimed in claim 9, wherein:
said arrangement reverse means comprises n selectors, each of which receives said n output signals from said priority-based select means and said control signal; and
an ith selector (i=1, 2, ..., n) among said n selectors selects one of said n output signals, which has an ith position of said first arrangement of said n input signals in accordance with said control signal.

15. A signal select circuit as claimed in claim 9, wherein:
each of said n input signals has a first level corresponding to a valid input signal, and a second level corresponding to an invalid input signal; and
said valid input signal indicates that a corresponding one of said signal circuits is normally operating, and said invalid input signal indicates that a corresponding one of said signal circuits has a failure.

16. A signal select circuit as claimed in claim 9, wherein said one of said n input signals, as received by said priority-based select circuit and which has said highest priority among said valid input signals, is handled thereby as a first level and each of the other (n−1) input signals is handled thereby as a second level.

17. A signal select circuit as claimed in claim 9, wherein each of said n input signals has said corresponding value indicating whether a corresponding source generating a corresponding predetermined signal is valid and therefore functioning in a normal state.

18. A signal select circuit as claimed in claim 9, wherein:
said control signal generating means comprises memory means for storing all combinations of possible priority orders; and
input means, operatively coupled to said memory means, for reading out one of said possible priority orders from said memory means, and
wherein said control signal indicates said one of said possible priority orders read out from said memory means.

19. A signal select circuit as claimed in claim 9, wherein said one of said n output signals generated by said priority-based select means and which has said highest priority among said valid n input signals, has a first level and each of the other output signals has a second level.

* * * * *

UNITED STATES PATENT AND TRADEMARK OFFICE
CERTIFICATE OF CORRECTION

PATENT NO. : 5,247,294
DATED : Sep. 21, 1993
INVENTOR(S) : SUNAGA

It is certified that error appears in the above-indentified patent and that said Letters Patent is hereby corrected as shown below:

Col. 7, line 35, change "B1 Bn" to --B1 - Bn--.

Col. 9, line 17 (Claim 9, line 4), change "said signal" to --said n signal--.

Signed and Sealed this

Second Day of September, 1997

BRUCE LEHMAN

*Attest:*

*Attesting Officer*    Commissioner of Patents and Trademarks